(12) United States Patent
Shachaf et al.

(10) Patent No.: US 11,346,790 B1
(45) Date of Patent: May 31, 2022

(54) FOCUS SYSTEM FOR OBLIQUE OPTICAL METROLOGY DEVICE

(71) Applicant: Onto Innovation Inc., Wilmington, MA (US)

(72) Inventors: Amit Shachaf, Los Gatos, CA (US); Daniel Thompson, San Jose, CA (US); John F. Lesoine, San Jose, CA (US)

(73) Assignee: Onto Innovation Inc., Wilmington, MA (US)

( * ) Notice: Subject to any disclaimer, the term of this patent is extended or adjusted under 35 U.S.C. 154(b) by 56 days.

(21) Appl. No.: 17/110,210

(22) Filed: Dec. 2, 2020

(51) Int. Cl.
*G01N 21/95* (2006.01)
*G01B 11/25* (2006.01)

(52) U.S. Cl.
CPC ......... *G01N 21/9501* (2013.01); *G01B 11/25* (2013.01); *G01N 2201/068* (2013.01)

(58) Field of Classification Search
CPC ......... G01N 21/9501; G01N 2201/068; G01B 11/25
USPC ...................................................... 356/237.5
See application file for complete search history.

(56) References Cited

U.S. PATENT DOCUMENTS

| | | | |
|---|---|---|---|
| 5,486,701 A * | 1/1996 | Norton ................ | G01N 21/55 250/372 |
| 5,608,526 A * | 3/1997 | Piwonka-Corle .... | G01N 21/211 356/73 |
| 7,679,633 B2 | 3/2010 | Van Brocklin | |
| 7,764,376 B2 | 7/2010 | Fielden et al. | |
| 10,365,211 B2 | 7/2019 | Blasenheim et al. | |
| 2007/0008286 A1 | 1/2007 | Theytaz | |
| 2017/0032033 A1 | 3/2017 | Stewart | |
| 2017/0205342 A1 * | 7/2017 | Krishnan ............. | G01J 3/0224 |

FOREIGN PATENT DOCUMENTS

| | | |
|---|---|---|
| CN | 103471992 A | 12/2013 |
| EP | 1027701 | 6/2004 |

OTHER PUBLICATIONS

International Search Report and Written Opinion dated Feb. 23, 2022, from PCT Application No. PCT/US2021/057904, filed Nov. 3, 2021.

* cited by examiner

*Primary Examiner* — Roy M Punnoose
(74) *Attorney, Agent, or Firm* — Paradice and Li LLP (57) ABSTRACT

The light from an optical metrology device is focused into a measurement spot on a sample using a focusing system. The focusing system uses an image of the light reflected from the measurement spot to determine a best focal position at a desired position of the sample. The focusing system selects a characteristic of reflected light, such as polarization state or wavelengths, to use for focusing. The characteristic of the reflected light that is selected for use in determining focal position is affected different by different portions of the sample. For example, light reflected from a top surface of a sample may have a different characteristic than light reflected by an underlying layer. The selected characteristic of the reflected light is used by the focusing system to focus the measurement spot at the top surface or an underlying layer of the sample.

20 Claims, 8 Drawing Sheets

FOCUS SYSTEM FOR OBLIQUE OPTICAL METROLOGY DEVICE

FIELD OF THE DISCLOSURE

The present invention is related to optical metrology, and in particular to focusing an optical metrology device.

BACKGROUND

Semiconductor and other similar industries often use optical metrology equipment to provide non-contact evaluation of substrates during processing. With optical metrology, a sample under test is illuminated with light, e.g., at a single wavelength or multiple wavelengths. After interacting with the sample, the resulting light is detected and analyzed to determine a desired characteristic of the sample.

Some optical metrology devices use light that is obliquely incident on the sample and reflects or scatters off a sample before being detected. One example of an optical metrology device that uses an oblique angle of incidence is an ellipsometer. Ellipsometers are optical metrology devices that detect changes in the polarization state of light reflected from a surface of a sample in order to measure characteristics of the sample. Other types of optical metrology devices, such as reflectometers may use light at oblique angle of incidence as well.

Oblique optical metrology devices, such as ellipsometers and reflectometers, must be properly focused on the sample. Some systems use independent focusing systems, i.e., systems that attached to the optical metrology device, but that use an independent light path to determine the position of the focusing system, and thus, the optical metrology device, with respect to the sample. Such focusing systems, however, require very precise alignment, which is expensive and difficult. Integrated focusing systems sometimes use a mirror with an aperture, where the mirror reflects the outside rays of the light reflected from the sample to a focus detector, while the inner rays of the reflected light are transmitted through the aperture and are received by the detector for the optical metrology device. Such devices, however, are susceptible to inaccuracies due to stray light.

SUMMARY OF THE DISCLOSURE

The light from an optical metrology device is focused into a measurement spot on a sample using a focusing system. The focusing system uses an image of the light reflected from the measurement spot to determine a best focal position at a desired position of the sample. The focusing system may be configured to select characteristics of light that is reflected from the sample to determine the focus position. The selected characteristic, for example, may be the polarization state or wavelength, of the light. Light that is reflected from a top surface of some samples, for example, may have a different polarization state than the light reflected by an underlying layer. Similarly, light reflected from a top surface of a sample may have a wavelength characteristic that is different than the light reflected by an underlying layer. For example, the top surface may reflect light in both the ultraviolet (UV) and visible wavelengths, while the bottom surface may reflect light only in the visible wavelengths. Accordingly, the focusing system may be configured to distinguish reflections from the top surface of the sample and reflections from an underlying layer based on the selected characteristic, e.g., polarization state or wavelengths, of the reflected light, and to use the selected characteristics to focus the measurement spot at a desired level.

In one implementation, a focusing system for determining a focus position of an optical metrology device may include a beam splitter that is positioned in an optical path of reflected light. The beam splitter is configured to direct a portion of the reflected light to a measurement detector and to direct a remaining portion of the reflected light to a focus detector. The focusing system may further include a focus detector that is positioned to receive the remaining portion of the reflected light from the beam splitter. The focus detector receives an image of the reflected light on a detector array, wherein the image of the reflected light comprises at least one of a first image of light reflected from a top surface of the sample and a second image of light reflected from one or more layers underlying the top surface or a combination thereof, and generates signals based on a location of the image and a characteristic of the reflected light that identifies at least one of the first image and the second image. For example, the characteristic of the reflected light may be the polarization state or wavelengths (e.g., UV or visible-NIR) of the light. At least one processor is coupled to receive the signals from the focus detector and to determine the focus position of the optical metrology device based on the signals.

In one implementation, a method of determining a focus position of an optical metrology device may include directing a first portion of reflected light from a sample towards a measurement detector and directing a second portion of the reflected light towards a focus detector. An image of the reflected light is detected with the focus detector, wherein the image of the reflected light comprises at least one of a first image of light reflected from a top surface of the sample and a second image of light reflected from one or more layers underlying the top surface or a combination thereof. A portion of the reflected light is selected based on a characteristic of the reflected light that identifies at least one of the first image and the second image to determine a focus position of the optical metrology device. For example, the characteristic of the reflected light may be the polarization state or wavelengths (e.g., UV or visible-NIR) of the light. The focus position of the optical metrology device is determined using a location of the image on the focus detector and the selected portion of the reflected light.

In one implementation, a focusing system for determining a focus position of an optical metrology device may include a beam splitter positioned in an optical path of reflected light. The beam splitter may be configured to direct a portion of the reflected light to a measurement detector and to direct a remaining portion of the reflected light to a focus detector. The focus detector may be positioned to receive the remaining portion of the reflected light. The focus detector receives an image of reflected light on a detector array, wherein the image of the reflected light comprises at least one of a first image of light reflected from a top surface of the sample and a second image of light reflected from one or more layers underlying the top surface or a combination thereof. The optical metrology device may further include a means for selecting a portion of the reflected light based on a characteristic of the reflected light that identifies at least one of the first image and the second image to determine a focus position of the optical metrology device. For example, the characteristic of the reflected light may be the polarization state or wavelengths (e.g., UV or visible-NIR) of the light. The optical metrology device may further include a means for determining the focus position of the optical metrology device based on the image of the reflected light and the selected portion of the reflected light.

DETAILED DISCLOSURE

Oblique optical metrology devices, including oblique angle reflectometers and ellipsometers, require proper focusing of the light that is incident on the sample. Because multiple areas of a sample, e.g., a semiconductor wafer, may be measured by the optical metrology device, the optical metrology device must be properly focused at each measurement location. To alter the focal position of such an optical metrology device, the distance between the optical system and the sample may be adjusted, which takes time. Accordingly, it is desirable to not only determine the focus position accurately, but the focus position should be determined quickly.

An accurate, real time focus system for an oblique optical metrology device may use an image of the measurement spot on the sample to determine a best focal position for the device. For example, the light reflected from the sample may be split, so that a portion of the light is received by the metrology device's detector for measurement, while another portion of the reflected light is directed to the focusing system. The focusing system may receive an image of the measurement spot on the sample and use that image to determine and adjust the focus position of the optical metrology device. The use of the measurement spot reflected from the sample provides an accurate and fast determination of the focus position.

Some samples, however, generate multiple reflections of the incident light. For example, some samples will produce one reflection from the top surface of the sample, and another reflection off of one or more layers that are underlying the top surface. An example of a sample that produces multiple reflections is a device that has many stacked layers or one or more thick layers that are semitransparent to the wavelengths of light used by the optical metrology device. For example, 3D memory technologies, such as vertical NAND flash, rely on the stacking of multiple layers of memory cells. When an oblique metrology device measuring such a device, the focusing system may receive multiple images of the measurement spot, one from the top surface and one from an underlying layer that may make accurate focus position determination difficult. If the desired point of focus is at the top surface of the sample, an imaged measurement spot produced by reflected light from the bottom of the sample may produce inaccuracies or uncertainty in the focal position determination.

A focusing system may be configured to select light to be used to determine a focus position of the optical metrology device based on a characteristic of the reflected light. For example, the focusing system may select light based on polarization or wavelength to determine a focus position of the optical metrology device. Moreover, the focusing system may select light reflected from the top surface of the sample or light reflected from one or more layers underlying the top surface to use in order to determine the focus position of the optical metrology device. For example, the focusing system may be configured to distinguish reflections from the top surface of the sample and reflections from an underlying layer based on a characteristic of the reflected light.

In one implementation, the focusing system may distinguish the top surface and an underlying layer based on the polarization state of the reflected light. The light reflected from the top surface may have a different polarization state than the light reflected from an underlying layer. The focusing system may include polarizers to select light with the desired polarization state, i.e., the polarization state corresponding to light reflected from the top surface or the underlying layer. For example, the focusing system may use a polarization sensitive detector that includes an array of micropolarizer pixels aligned with corresponding pixels in a detector array to select signals from pixels that receive light having polarization states corresponding to the light reflected from the top surface or the underlying layer.

In one implementation, the focusing system may distinguish the top surface and an underlying layer based on the wavelengths of reflected light. For example, the light having a first range of wavelengths, such as ultraviolet, may be more sensitive to surface reflections, while light having a second range of wavelengths, e.g., in the visible or infrared spectrum, may be more sensitive to underlying layer reflections. The focusing system may include one or more filters to select light with the desired wavelength range to select light reflected from the top surface or the underlying layer. For example, the focusing system may use a filter on at least a portion of the detector array to select light have the range of wavelengths corresponding to the top surface or the underlying layer.

Figure 1:
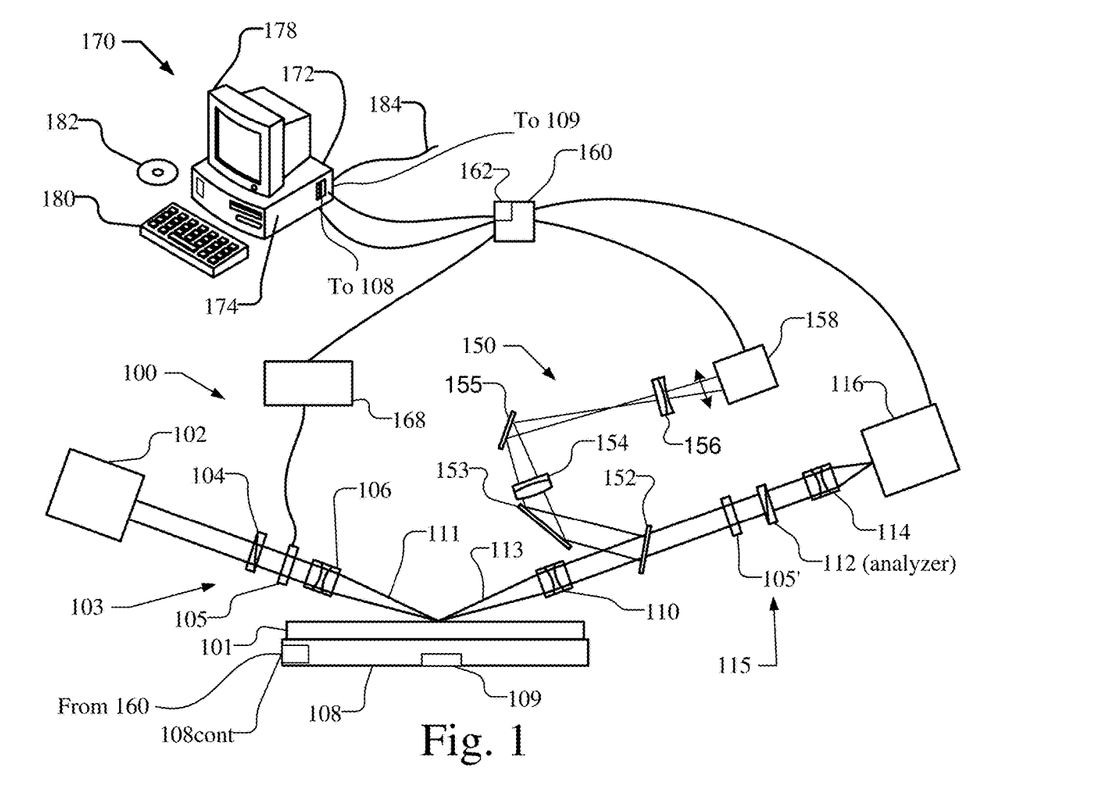
FIG. 1 illustrates an oblique optical metrology device with a focusing system.

FIG. 1 illustrates an optical metrology device 100 with a focusing system 150. As illustrated, optical metrology device 100 includes a light source 102, which may be monochromatic or polychromatic, and thus, may produce narrow band or broad band light 111. An objective lens 106 focuses the light 111 on the surface of a sample 101 that is held and positioned on a stage 108. The light 111 is incident on the sample 101 at an oblique angle of incidence. The light 111 interacts with and reflects from the sample 101 as reflected light 113 and is received by another objective lens 110 that may match objective lens 106. The reflected light 113 from the objective lens 110 may be focused by another lens system 114 and received by a detector 116. The detector 116 may detect the intensity of the reflected light 113 at one or more wavelengths and may be used to determine one or more characteristics of the sample 101.

In some implementations, the optical metrology device 100 may be a reflectometer, which may use unpolarized or polarized light. Thus, for example, the optical metrology device 100 may include a polarizer 104. In some implementations, the optical metrology device 100 may be an ellipsometer and may include a polarization state generator 103 (PSG) and a polarization state analyzer 115. A polarization state generator is used to generate a known polarization state, which may be static or may vary, in light that is to be incident on a sample. The polarization state generator 103 includes a polarizer 104 and may include a rotating compensator 105. A polarization state analyzer is used to analyze the polarization state of light after the light interacts with the sample. The polarization state analyzer 115 includes another polarizer 112, commonly referred to as analyzer 112. In some implementations, a compensator 105' may be located after the sample 101 in the polarization state analyzer 115, and compensator 105 in the polarization state generator 103 may be removed. In other implementations, both compensators 105 and 105' may be used. If desired, compensator 105 may be stationary and one or both of polarizer 104 and analyzer 112 may rotate, or alternatively, compensator 105 as well as polarizer 104 and analyzer 112 may rotate. In implementations, in which the optical metrology device 100 is an ellipsometer, the incident light 111 has a known polarization state due to the polarization state generator 103. The sample 101 will alter the polarization state of the light and the resulting light reflected by the sample 101 is analyzed by the polarization state analyzer 115, e.g., by passing the reflected light 113 through the analyzer 112 (and compensator 105' if located after the sample 101). The detector 116 detects the intensity of the reflected light 113, which may be used, along with the known positions of the polarizer 104, analyzer 112, and compensator 105 to determine ellipsometric parameters, $\psi$ and $\Delta$, from which various parameters of the sample 101 may be determined, which is well known in the art.

In order to properly measure the sample 101, the optical metrology device 100 is positioned at a best focal position with respect to the sample 101. The optical metrology device 100, thus, includes an integrated auto focusing system 150 that images the same light rays that are used by the optical metrology device 100. Focusing system 150 includes a beam splitter 152 and a focus detector 158 for focusing. The focusing system 150 may include additional optical elements for directing the light from the beam splitter 152 to the focus detector 158. For example, as illustrated, the focusing system 150 may include a folding mirrors 153 and 155, and lens systems 154 and 156. The beam splitter 152 of the focusing system 150 directs, e.g., reflects, a portion of the reflected light 113, e.g., 4% to 10% of the total light intensity, to the focus detector 158 in the focusing system 150 and directs, e.g., transmits, the remaining portion of the reflected light 113, e.g., 90% or more of the total light intensity, to the measurement detector 116. The use of beam splitter 152, which is sometimes referred to as a "pick off" beam splitter, is advantageous as the entire cross section of the reflected light 113 beam is sampled by the focusing system 150, as opposed to only a portion of the reflected beam, e.g., the outside rays, as found in a system that uses an aperture in a mirror. By sampling the entire beam of the reflected light 113, the focusing system 150 is insensitive to systematic errors caused by sampling only portions of the reflected light 113. In some implementations, the beam splitter 152 may be used to select the characteristics of the light used to determine the focus position of the optical metrology device. For example, the beam splitter 152 may select the polarization state or wavelengths to be used in the focusing system 150.

As illustrated in FIG. 1, if a polarization state analyzer 115 is present, the beam splitter 152 for the focusing system 150 is in the optical path before the polarization state analyzer 115. By placing the beam splitter 152 before the analyzer 112, the intensity of the light received at the focus detector 158 is not modulated due to the rotation of the polarizing optics. The beam splitter 152, thus, directs a portion of the reflected light 113 to the detector 158 before the reflected light is modulated by the analyzer 112. Accordingly, the reflected light 113 imaged onto a focal plane array, i.e., detector 158, of the focusing system 150 does not have a modulated intensity.

The rotation of a polarizing optical element in the polarization state generator 103, such as polarizer 104 or compensator 105, may still produce a wobble in the spot imaged on the detector 158 of the focusing system 150 as the rotating optic rotates. If desired, the analyzer 112 may rotate and the polarizer 104 and compensator 105 held stationary, which will avoid a wobble in the spot imaged by the detector 158 produced by a rotating optic. Further, if desired, the beam splitter 152 may be positioned in the beam path before the compensator 105', while one or both of the analyzer 112 and the compensator 105' rotate and the polarizer 104 is held stationary, which will again avoid a wobble in the spot imaged by the detector 158 produced by a rotating optic(s).

The beam splitter 152 may be a pellicle beam splitter, which may have a thinness, e.g., 0.002 mm, that does not significantly impact the optical path length or aberrations in a converging beam. The effect on optical path length and aberrations would be even less in a collimated beam, as illustrated in FIG. 1. The use of a pellicle beam splitter may further minimize chromatic aberrations and prevent imaging ghosts.

Figure 2:
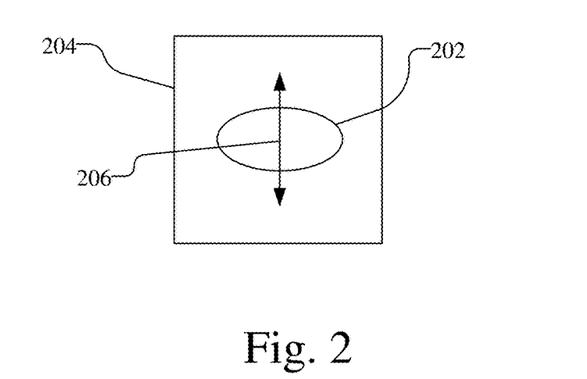
FIG. 2 illustrates a top plan view of a sensor array of the focus detector and a spot of light on the sensor array that is used to determine the focus position of the optical metrology device.

FIG. 2 illustrates a top plan view of a sensor 204 of the focus detector 158 and a spot 202 of light produced by the lens system 156. The sensor 204 may be, e.g., a two dimensional sensor array. The position of the spot 202 on the sensor 204, which may move as illustrated by the arrow 206, is used as an indication of the focus position of the optical metrology device 100. The spot 202 may be 1%-50%, e.g., 10% or less, of the size of the sensor 204, which increases the useful auto-focus range. The lenses of lens system 156 are arranged to magnify the deviation from the best focus position thereby providing greater measurement precision. For example, as illustrated by arrow 206 in FIG. 2, the movement of the location of the spot 202 on the sensor 204 provides a magnified indication of the deviation from the best focus position. The size of the spot on the sensor 204 may change slightly as the sample 101 is scanned through the focal range, however, this is a relatively small effect to which the spot location calculation may be configured to be insensitive. The magnification produced by lens system 154 with respect to the deviation from the best focus position may be 2× to 5× or greater, such as 10×. However, reduction of spot size decreases the focus precision and, thus, a trade-off between auto focus range and precision is made, as smaller spot makes the spot location calculation less precise but provides a higher spot intensity. Accordingly, if desired, a large spot, e.g., the size of the sensor 204 may be produced, which may be used to provide a more accurate spot location calculation.

As illustrated in FIG. 1, the detector 158 for the focusing system 150 is coupled to a computer 170, e.g., through a frame grabber board 160. The rotating optical element, if any, such as the compensator 105, polarizer 104, or analyzer 112, and the stage 108 may also be connected to the frame grabber board 160 directly or through controller/drivers, e.g., illustrated by driver 168. If desired, the detector 116 for the optical metrology device 100 may be coupled to the same computer 170 or a different computer. The computer 170 includes one or more processors 172 with memory 174, as well as a user interface including e.g., a display 178 and input devices 180. The frame grabber board 160 includes one or more processors 162, (which may be a field programmable gate array (FPGA)) that is configured to determine a focus error, which is used to control the focus position of the stage 108, e.g., via a stage servo controller 108cont that receives focus error data from the frame grabber board 160 and controls an actuator 109 in the stage 108 accordingly. Thus, in one embodiment, the frame grabber board 160 is processing the focus error directly from the detector 158 and providing the focus adjustment to the stage servo controller 108cont without input from the computer 170. Of course, if desired, computer 170 may be used in part or all of the processing of the focus error and instructing the stage servo controller 108cont. It should be understood that a processor, such as processor 162 on frame grabber board 160, may include one or more separate processing units, e.g., processor 162 may include a first processor for image processing and a separate processor for focus error determination. Additionally, one or more processors may be located in other positions, besides frame grabber board 160. For example, processor 162 (or one or more of the processor units that comprise processor 162) may be located in detector 158, or elsewhere.

If the processor 172 is, e.g., a microprocessor, that carries out instructions of a computer program, the data structures and software code for automatically implementing one or more acts described in this detailed description can be implemented by one of ordinary skill in the art in light of the present disclosure and stored, e.g., on a computer readable storage medium, such as memory 174 or medium 182, which may be any device or medium that can store code and/or data for use by a computer system. The computer readable storage medium 174/182 may be, but is not limited to, magnetic and optical storage devices such as disk drives, magnetic tape, compact discs, and DVDs (digital versatile discs or digital video discs). A communication port 184 may also be used to receive instructions that are used to program the processor 172 to perform any one or more of the functions described herein and may represent any type of communication connection, such as to the internet or any other computer network. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described. For example, as discussed above, a field programmable gate array (FPGA) may be used. The FPGA may be either in the detector 158 or on a frame grabber board 160 internal or external to the computer 170. Where processor 172 is an FPGA, computer readable storage medium 174/182 may provide the programming file to embed the desired configuration in the processor 172, which may be performed one time for a non-volatile FPGA, or otherwise at power-up. By avoiding the use of the main system CPU to perform the necessary calculations for auto focusing, the CPU is not slowed down. Further, a dedicated processor increases the image processing speed. Thus, the stage servo controller 108cont may be directly coupled to the frame grabber board 160, which may provide a signal directly to the stage servo controller 108cont through a Serial Peripheral communication Interface (SPI) channel.

Focusing an oblique angle optical metrology device, such as metrology device 100, may be difficult if the sample 101 produces multiple reflections from the incident light. For example, the reflected light 113 may include reflections from both a top surface of the sample 101 and one or more layers underlying the top surface. If the focusing system 150 receives multiple reflections from the sample 101, it may be difficult to determine which reflection is from the desired focal position, i.e., the top surface of the sample 101, resulting in inaccuracies in the focal position.

Figure 3:
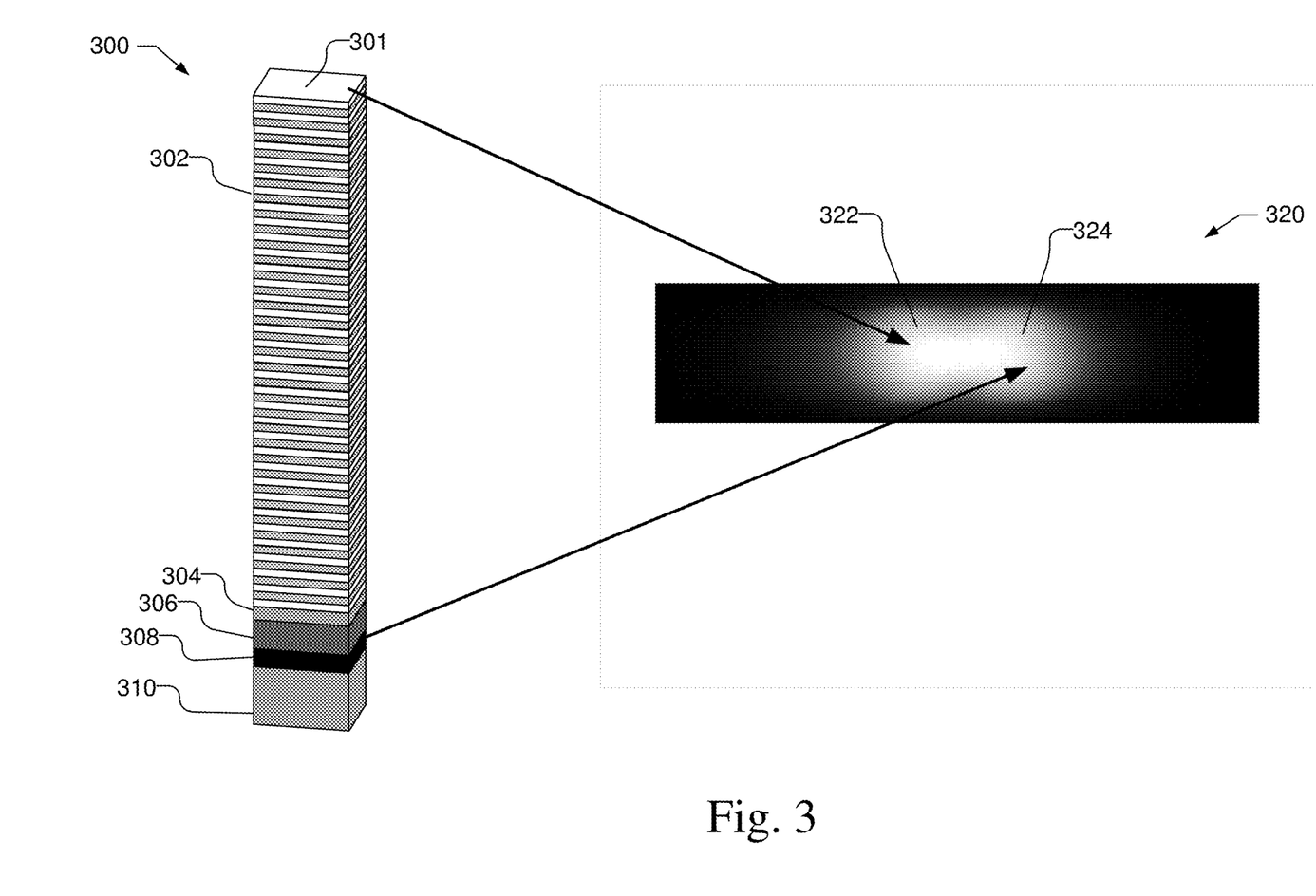
FIG. 3 illustrates a sample that includes a film stack that produces multiple reflections on the sensor array of the focus detector.

FIG. 3, by way of example, illustrates a sample 300 that includes a film stack that may produce multiple reflections on the sensor array of the focus detector in the optical metrology device 100. The sample 300, for example, may include a stack of a large number, e.g., 256, pairs 302 of layers, e.g., of silicon dioxide and the tungsten. The tier stack may be on a stack of oxide 304, polysilicon 306, metal 308 (e.g., tungsten), and oxide 310, which may be on silicon (not shown). Light that is reflected from the film stack in sample 300 may be reflected from the top surface 301 of the sample 300 and from the bottom of the sample 300, e.g., from the metal layer 308. Reflections from layers between the top surface and the metal layer 308, e.g., layers 302, are weak and may not be visible (or desirable) in the focusing system. Accordingly, FIG. 3 further illustrates a detector image 320 illustrating the light that may be reflected from sample 300. As illustrated, one spot 322 may be reflected from a top surface 301 of the sample 300, while another spot 324 may be reflected from a layer underlying the top surface 301 of the sample 300, e.g., the metal layer 308. The presence of multiple spots 322 and 324, which may partially overlap or may be separated, in the detector image 320, may produce complications and inaccuracies when determining the focal position for the sample 300. For example, an average of the positions of the spots 322 and 324, instead of the actual position of the spot from the desired focal position, e.g., spot 322, may be used to determine the focal position.

The film stack of the sample 300 may produce different effects on characteristics of the light reflected from the top surface 301 and the underlying layer 308. Accordingly, the focusing system 150 may be configured to distinguish reflections from the top surface of the sample and reflections from an underlying layer based on a characteristic of the reflected light. For example, the film stack of the sample 300 may produce different polarizations of the light reflected from the top surface 301 and the underlying layer 308. Accordingly, the focusing system 150 may distinguish the top surface and an underlying layer based on the polarization state of the reflected light. For example, in one implementation, the focus detector 158 may distinguish reflections from the top surface of the sample and reflections from an underlying layer based on the polarization states of the reflected light. In another example, the top surface 301 and the underlying layer 308 of the film stack of the sample 300 may reflect different wavelengths of light. Accordingly, the focus detector 158 may distinguish reflections from the top surface 301 of the sample and reflections from an underlying layer 308 based on the wavelengths of reflected light.

Figure 4:
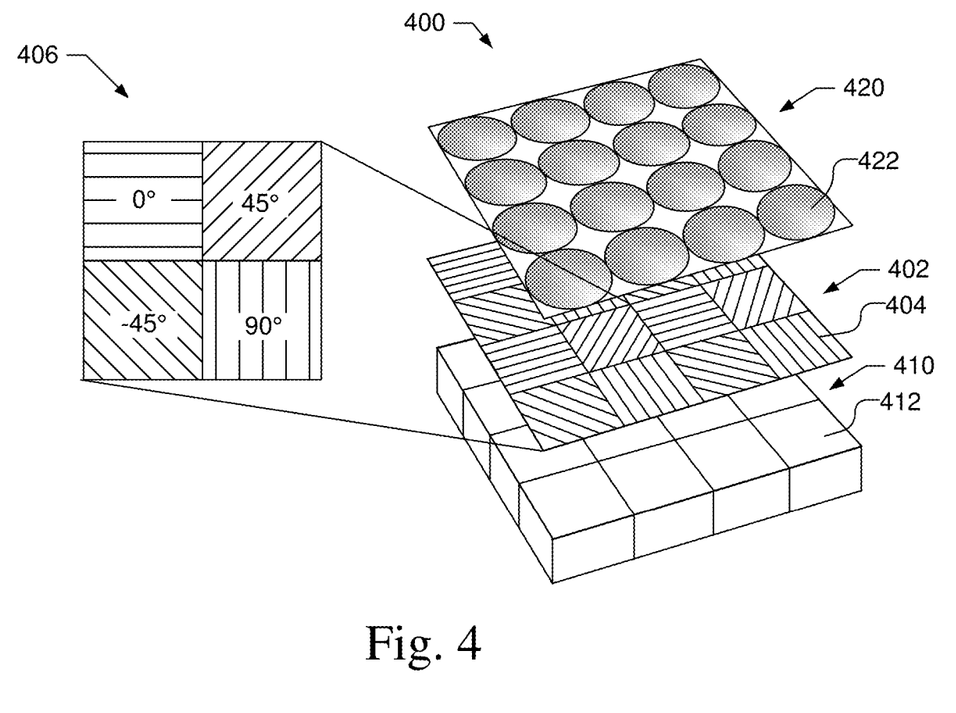
FIG. 4 illustrates a polarization detector that may be used as the focusing detector in the focusing system.

FIG. 4 illustrates an example of a polarization detector 400 that may be used as focus detector 158 in the focusing system 150 to select the portion of light reflected from a sample to be used for determine the focus position of the optical metrology device 100. If the polarization detector 400 is used as the focus detector 158, the optical metrology device 100 include a polarizer 104 (shown in FIG. 1), e.g., in a polarized reflectometer mode or an ellipsometer mode, to polarize the light 111 that incident on the sample 101. Additionally, because polarization effects are used to distinguish the light reflected from the top surface 301 and underlying layer 308 using the polarization detector 400, the beam splitter 152 in the focusing system 150 is located in the optical path before the analyzer 112 or compensator 105' if present.

The polarization detector 400 may be an imaging polarimeter camera, which may use, e.g., the IMX250MZR sensor from Sony, such as used in detectors produced by Imperx, Inc. JAI, Inc., FLIR Inc., and 4D Technology. The polarization detector 400 includes a micropolarizer array 402, which is aligned with a two-dimensional sensor 410. The micropolarizer array 402 is an array of wire grid polarizers 404 having a number, e.g., four, of polarization orientations. Each polarizer 404 in the micropolarizer array 402 is aligned with a pixel 412 in the two-dimensional sensor 410. Additionally, the polarization detector 400 may include a microlens array 420, with each lens 422 aligned with a separate polarizer 404 and pixel 412.

The polarization detector 400 may be defined as an array of macro pixels, with each macro pixel including a number of pixels having wire grid polarizers 404 with different polarization states aligned with detector pixels 412. For example, as illustrated in FIG. 4, a macro pixel 406 may be defined as a 2×2 array of pixels having 4 different polarization states, e.g., 0°, 45°, −45°, and 90°. The polarization detector 400 may include a number of macro pixels, e.g., a 227×227 macro-pixel array, to image the spots 322 and 324 (shown in FIG. 3) over multiple macro-pixels, and each macro-pixels detects four different polarization states.

Figure 5:
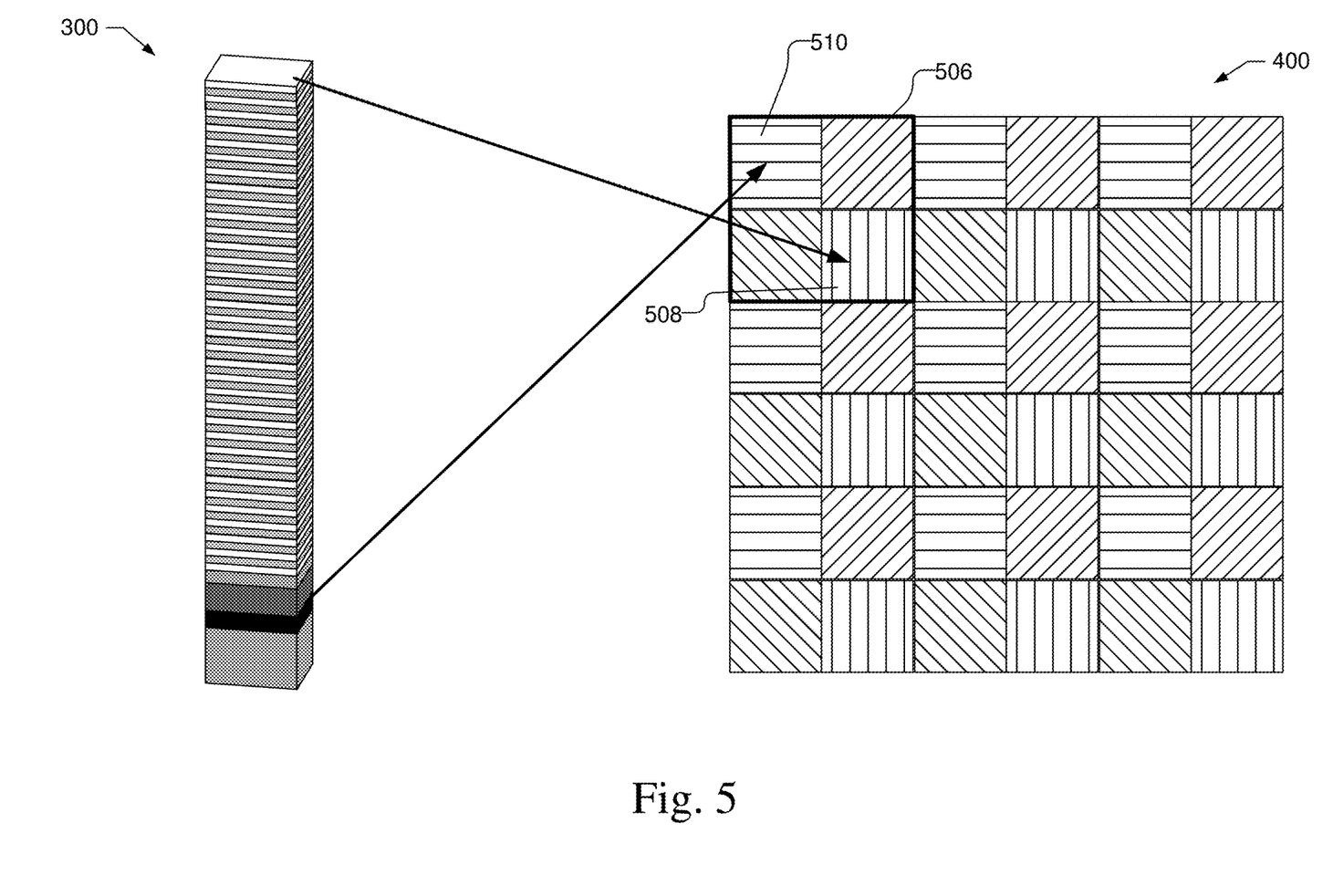
FIG. 5 illustrates a sample that includes a film stack that produces multiple reflections and a polarization detector that includes pixels that are sensitive to different reflections from the sample based on polarization of the reflected light.

FIG. 5 illustrates the sample 300 and a top plan view of a polarization detector 400, showing multiple macro pixels that include pixels that are sensitive to different reflections from the sample 300. As illustrated by macro pixel 506, the light reflected from the top surface 301 of the sample 300 have one polarization orientation and is detected by pixel 508, while the light reflected from the underlying layer 308 has a different polarization orientation and is detected by pixel 510. Accordingly, by using the signals from pixels in each macro pixel that are sensitive to reflections from the desired surface, the reflections from the undesired layers may be ignored and the focus position may be accurately determined. For example, assuming that the optical metrology device 100 is to be focused on the top surface 301 of the sample 300, only signals from pixel 508 in each macro pixel are used to determine the focus position.

In some implementations, the optical metrology device 100 may include a rotating polarization element, such as polarizer 104 or compensator 105, which will alter the polarization orientation of the light reflected from the sample 300. Thus, the pixel in the macro pixel 506 that is sensitive to the polarization state of the reflected light from a surface on the sample will change as the rotating polarization element rotates. Accordingly, polarization detector 400 will change the pixel in each macro pixel that is used to detect reflections from the desired surface synchronously with the rotation or the rotating polarization element.

Figure 6:
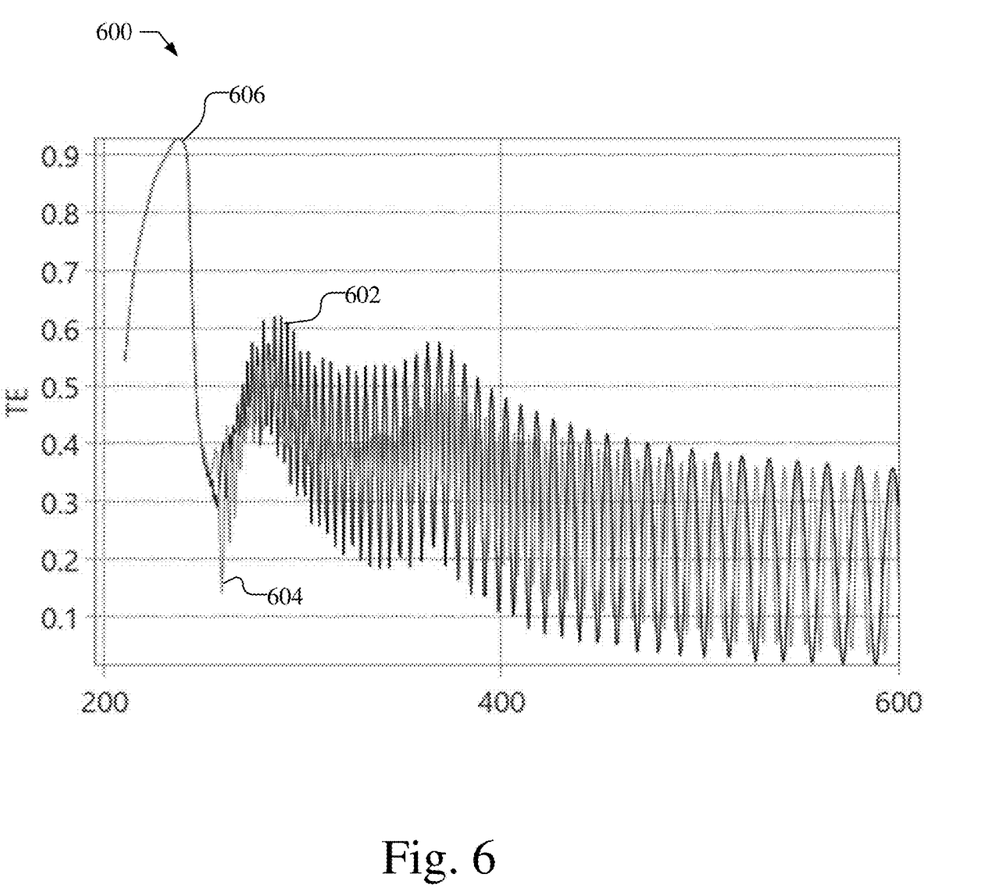
FIG. 6 is a graph illustrating wavelength sensitivity in light reflected from a film stack.

In some implementations, the top surface 301 and layers under the top surface 301 of the sample 300 may reflect different wavelengths of light. FIG. 6, for example, is a graph 600 illustrating wavelength sensitivity to light reflected from a film stack. FIG. 6 shows the normalized intensity with respect to wavelength for TE polarized light reflected from a film stack similar to sample 300 measured by an optical metrology device such as optical metrology device 100. Graph 600 illustrates two curves, one curve 602 representing a film stack with 100 layer pairs, and the other curve 604 representing a film stack with 200 layer pairs. As can be seen in graph 600, both curves 602 and 604 have a large smooth peak 606 in the ultraviolet wavelength range of approximately 210 nm to 240 nm. Wavelengths longer than ultraviolet, e.g., in the visible wavelengths greater than 400 nm, illustrate high frequency oscillation. The peak 606 in the ultraviolet wavelength range is due to reflections from the top surface 301 of the sample, which is opaque to ultraviolet light, while the visible wavelength range is due to reflections from the top surface 301 as well as surfaces below the top surface 301.

Accordingly, in an implementation in which the light source 102 produces broadband light, the focusing system 150 may distinguish the top surface and underlying layers based on the wavelengths of reflected light. In some implementations, the focusing system 150 may include a focus detector 158 capable of distinguishing reflections from the top surface 301 of the sample and reflections from an underlying layer 308 based on the wavelengths of reflected light. In some implementations, one or more filters may additionally or alternatively be used to select light with the desired wavelength range to distinguish light reflected from the top surface 301 of the sample and light reflected from an underlying layer 308 by the focus detector 158 based on the wavelengths of reflected light.

Figure 7:
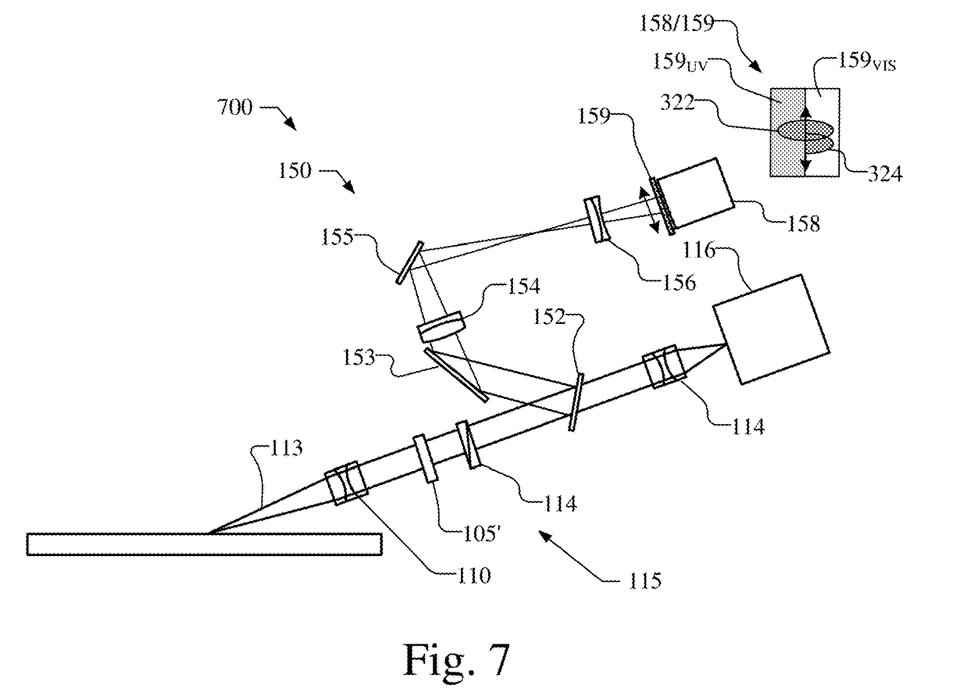
FIG. 7 illustrates a portion of the optical metrology device with a focusing system that includes one or more wavelength filters.

FIG. 7 illustrates a portion of the optical metrology device 100, and in particular illustrates one embodiment of the detector arm 700, e.g., after sample 101, of the optical metrology device 100. It should be understood that the illumination arm of the optical metrology device 100 (before the sample) may be the same as illustrated in FIG. 1, e.g., including the light source 102, objective lens 106, and optional polarization state generator 103. As illustrated in FIG. 7, the focusing system 150 may optionally be positioned after the polarization state analyzer 115 if present.

The focusing system 150 may include a UV sensitive focus detector 158. For example, the focus detector may be an ultraviolet camera with high sensitivity to wavelengths in at least the UV range and in some implementations extending to the visible and infrared range. For example, a backside illuminated CMOS camera may be used, such as a UV CMOS camera. The UV sensitive focus detector 158 may receive the reflected light and detect the ultraviolet light. Additionally, the optical components in the focusing system 150, e.g., folding mirrors 153 and 155, and lens systems 154 and 156, may be selected for UV performance. For example, the folding mirrors 153 and 155 may be UV enhanced aluminum coated fused silica mirrors, and lens systems 154 and 156 may be fused silica lenses, or another appropriate type of lens that provides a suitable response with UV wavelengths of interest.

In some implementations, one or more filters may be located before the focus detector 158, which may assist in distinguishing the ultraviolet light from visible light. For example, as further illustrated in FIG. 7, the focusing system 150 may further include a filter 159 before the focus detector 158. The filter 159 may pass wavelengths that correspond to the wavelengths reflected by the desired surface on the sample and may block other wavelengths. For example, if the top surface 301 of the sample 300 is the desired surface for focusing, the filter 159 may pass ultraviolet wavelengths and block longer wavelengths, e.g., visible and infrared wavelengths. In some implementations, as illustrated with the inset plan view of the detector 158 and spot 322 and the portion of spot 324, the filter 159 may include an ultraviolet portion $159_{UV}$ that passes only ultraviolet light, and visible portion $159_{VIS}$ that passes only wavelengths greater than ultraviolet, e.g., visible and infrared. The detector 158, for example, may have two different sections or types of detector elements that are suitable for receiving the different wavelengths and that are aligned with the corresponding ultraviolet portion $159_{UV}$ and visible portion $159_{VIS}$ of the filter 159. Accordingly, the focus detector 158 may receive in separate areas, the spot 322 reflected from the top surface 301 of the sample 300, which includes both ultraviolet wavelengths (shown in portion $159_{UV}$) and visible and infrared wavelengths (shown in portion $159_{VIS}$), and in a portion of spot 324 reflected from underlying layers 308 of the sample 300, which has only wavelengths that are greater than ultraviolet, e.g., visible or infrared (shown in portion $159_{VIS}$).

Figure 8:
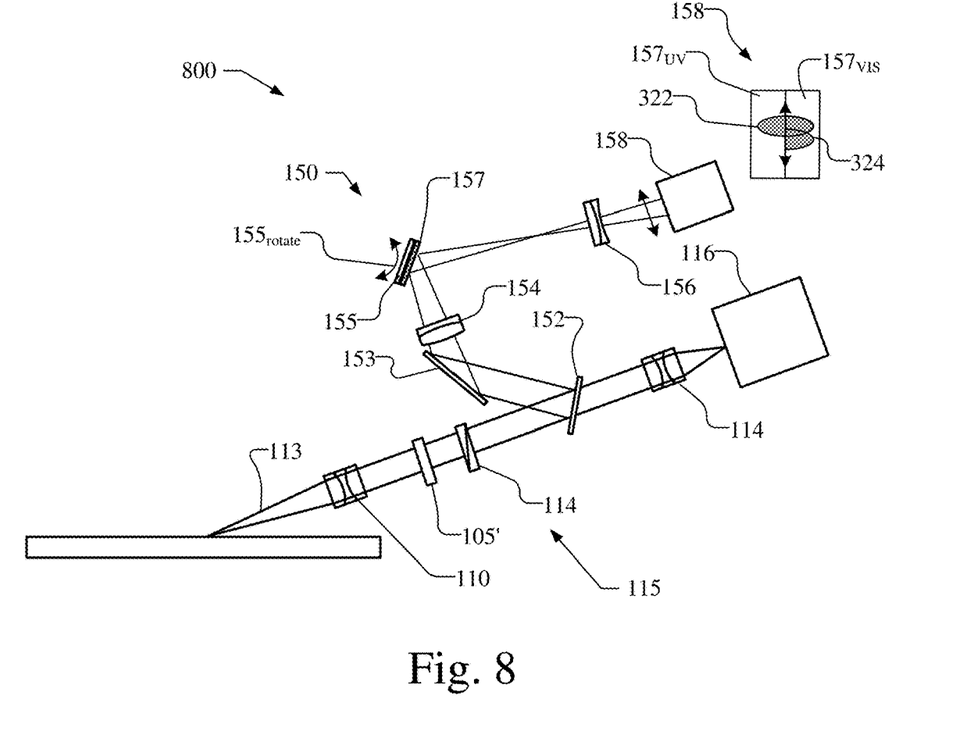
FIG. 8 illustrates a portion of the optical metrology device with a focusing system that includes one or more wavelength filters.

FIG. 8 is similar to FIG. 7 and illustrates a portion of the optical metrology device 100, and in particular illustrates another embodiment of the detector arm 800, e.g., after sample 101, of the optical metrology device 100. It should be understood that the illumination arm of the optical metrology device 100 (before the sample) may be the same as illustrated in FIG. 1, e.g., including the light source 102, objective lens 106, and optional polarization state generator 103. As illustrated in FIG. 8, the focusing system 150 may optionally be positioned after the polarization state analyzer 115 if present.

As illustrated in FIG. 8, the focusing system 150 may include a filter 157 in other locations besides immediately before the focus detector 158. For example, as illustrated in FIG. 8, the filter 157 may be positioned on the mirror 155. In other implementations, the filter 157 may be located on or may be the beam splitter 152. The filter 157 may pass wavelengths that correspond to the wavelengths reflected by the desired surface on the sample and may block other wavelengths. For example, if the top surface 301 of the sample 300 is the desired surface for focusing, the filter 157 may pass ultraviolet wavelengths and block longer wavelengths, e.g., visible and infrared wavelengths. In some implementations, as illustrated with the inset plan view of the detector 158 and spot 322 and portion of spot 324, the filter 157 may include an ultraviolet portion that passes only ultraviolet light that is received on a portion $157_{UV}$ of the detector 158, and a visible portion that passes only wavelengths greater than ultraviolet, e.g., visible and infrared, that is received on a portion $157_{VIS}$ of the detector 158. The detector 158, for example, may have two different types of detector elements that are suitable for receiving the different wavelengths and that are aligned with the corresponding ultraviolet portion $157_{UV}$ and visible portion $157_{VIS}$. In another implementation, the mirror 155 may be adjustable (as illustrated by the double arrow $155_{rotate}$) to reflect only ultraviolet light on the detector 158 when reflections from the top surface 301 of the sample 300 are the desired focus position, and to reflect only wavelengths greater than ultraviolet, e.g., visible or infrared, on the detector 158 when reflections from underlying layer 308 of the sample 300 are the desired focus position. Accordingly, the focus detector 158 may receive in separate areas, either simultaneously or separately, spot 322 reflected from the top surface 301 of the sample 300, which includes both ultraviolet wavelengths (shown in portion $157_{UV}$) and visible and infrared wavelengths (shown in portion $157_{VIS}$), and a portion of spot 324 reflected from underlying layers 308 of the sample 300, which has only wavelengths that are greater than ultraviolet, e.g., visible or infrared (shown in portion $157_{VIS}$).

Figure 9:
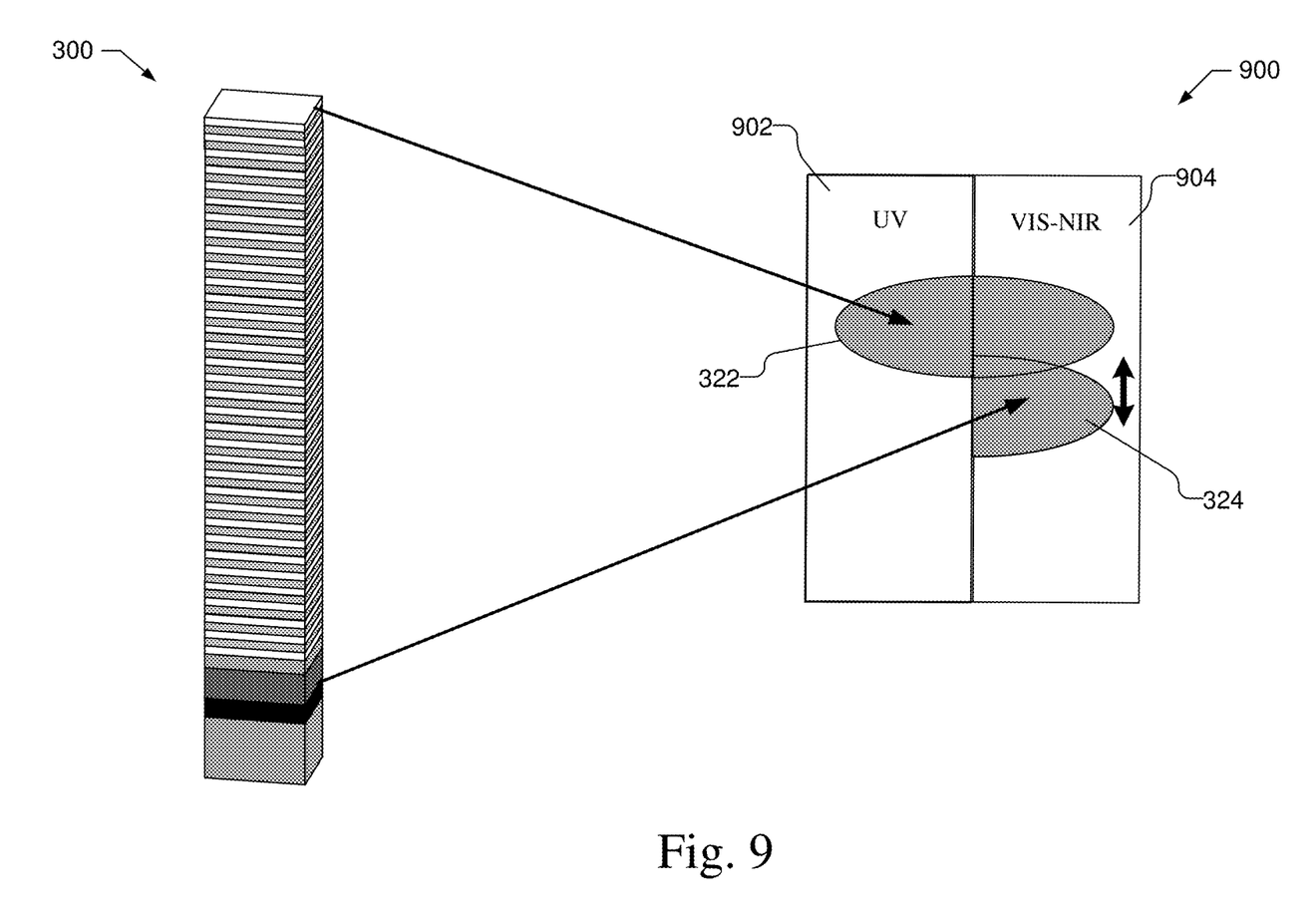
FIG. 9 illustrates a sample that includes a film stack that produces multiple reflections and a detector that is sensitive to different reflections from the sample based on wavelength of the reflected light.

FIG. 9 illustrates the sample 300 and a top plan view of a focusing detector 900, which may be the detector 158 with a filter 159 immediately before the detector 158, as shown in FIG. 7, or a filter 157 elsewhere in the optical path of the focusing system 150, such as on the mirror 155 as shown in FIG. 8. As illustrated, the detector 158 includes a UV portion 902 that receives ultraviolet light and a VIS-NIR portion 904 that receives longer wavelengths, such as visible or infrared light. The light reflected from the top surface 301 of the sample 300 will include ultraviolet light and visible or infrared light and thus, is received by the UV portion 902 and the VIS-NIR portion 904 as the spot 322, and the light reflected from an underlying layer 308 of the sample 300 does not include ultraviolet and only includes long wavelengths, such as visible or infrared light, and thus, is received by only the VIS-NIR portion 904 as a portion of the spot 324. Accordingly, by using the signals from pixels in the UV portion 902 and/or the VIS-NIR portion 904 reflections from the desired surface of the sample may be detected, while the reflections from the undesired layers are ignored or eliminated, and the focus position may be accurately determined. For example, assuming that the optical metrology device 100 is to be focused on the top surface 301 of the sample 300, only signals from the UV portion 902 are used to determine the focus position. On the other hand, assuming that the optical metrology device 100 is to be focused on the underlying layer 308 of the sample 300, signals from the VIS-NIR portion 904 may be used, which includes reflections from both the top surface and underlying surface, and signals from the UV portion 902 may be used to identify and exclude the spot 322 that is produced by the top surface of the sample.

Figure 10:
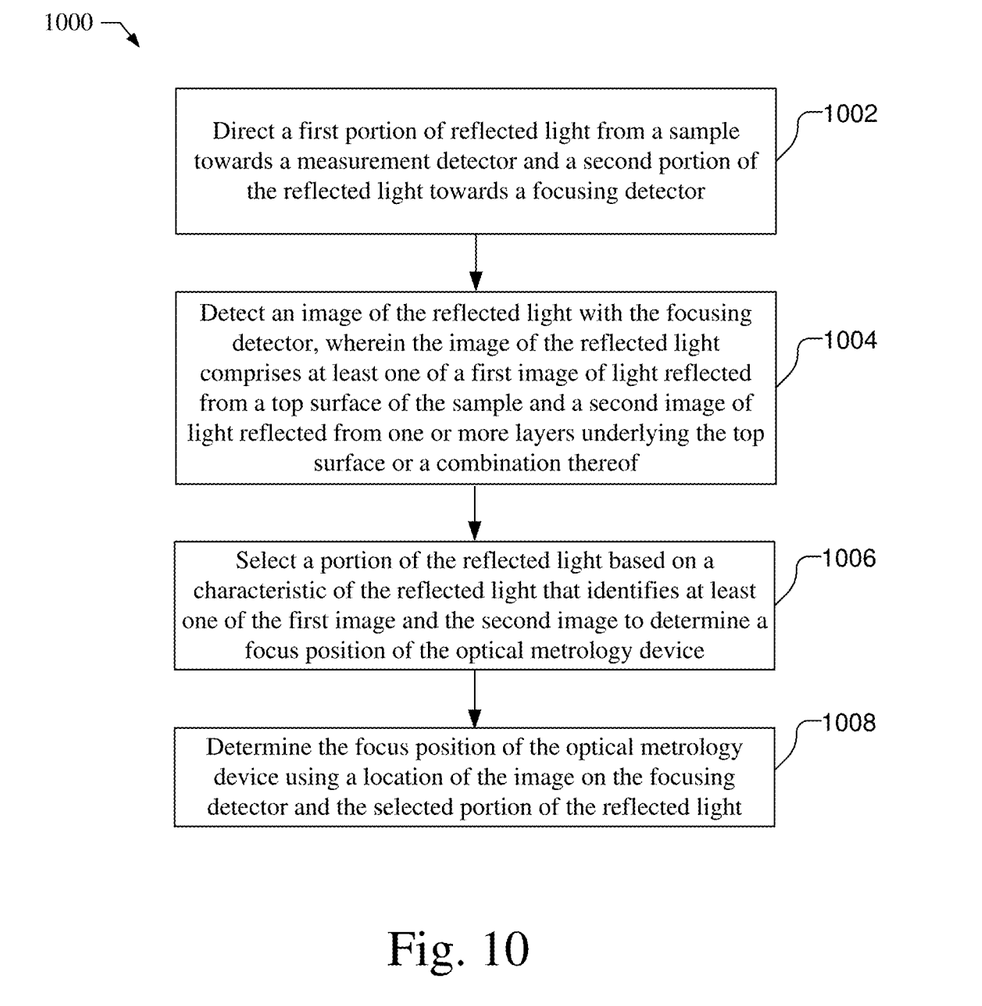
FIG. 10 is a flow chart illustrating a method of focusing an optical metrology device.

FIG. 10 is a flow chart 1000 illustrating a method of focusing an optical metrology device, such as optical metrology device 100 shown in FIG. 1, in accordance with embodiments described herein. In some implementations, the optical metrology device may direct light along an optical path that is obliquely incident on a sample. The light may be narrow band, e.g., single wavelength, or broadband. In some implementations, the light that is obliquely incident on the sample may be obliquely polarized, e.g., by a polarization state generator 103, which may include polarizer 104 and may further include a compensator 105, one or more of which may be a rotating element. A means for directing light along an optical path that is obliquely incident on a sample may be, e.g., the objective lens 106, shown in FIG. 1, that directs light 111 produced by light source 102 to be obliquely incident on a sample.

At block 1002, a first portion of reflected light from the sample is directed towards a measurement detector and a second portion of the reflected light towards a focus detector. The reflected light from the sample may be directed towards the focus detector before or after a polarization state analyzer, if present. By way of example, a polarization state analyzer, if present, may include an analyzer and may further include a compensator, one or more of which may be a rotating element. A means for directing a first portion of reflected light from the sample towards a measurement detector and a second portion of the reflected light towards a focusing detector may be, for example, the beam splitter 152, shown in FIG. 1, that directs a portion of the reflected light 113 towards the measurement detector 116 and directs another portion of the reflected light 113 towards the focus detector 158.

At block 1004, an image of the reflected light is detected with the focusing detector, wherein the image of the reflected light comprises at least one of a first image of light reflected from a top surface of the sample and a second image of light reflected from one or more layers underlying the top surface or a combination thereof. For example, the reflected light may be focused to form an image on the focusing detector, where the location of the image on the focusing detector provides an indication of the focus position of the optical metrology device. Multiple images may be formed, where a first image is produced by reflected light from a top surface of the sample and a second image is produced by one or more layers underlying the top surface. A means for detecting an image of the reflected light with the focusing detector, wherein the image of the reflected light comprises at least one of a first image of light reflected from a top surface of the sample and a second image of light reflected from one or more layers underlying the top surface or a combination thereof may be, for example, the focus detector 158, which receives the one or more images produced by the reflected light.

At block 1006, a portion of the reflected light is selected based on a characteristic of the reflected light that identifies at least one of the first image and the second image to determine a focus position of the optical metrology device. For example, in one implementation, where the light is obliquely incident on the sample, selecting the portion of the reflected light may include selecting or using polarization states that are sensitive to light reflected from one or more of the top surface of the sample or the one or more layers underlying the top surface of the sample. In another implementation, selecting the portion of the reflected light may include selecting or using wavelengths of light that are sensitive to light reflected from one or more of the top surface of the sample or the one or more layers underlying the top surface of the sample. For example, the top surface may reflect light in both the ultraviolet (UV) and visible to infrared wavelengths, while the bottom surface may reflect light only in the visible to infrared wavelengths. Thus, ultraviolet wavelengths may be selected to focus the optical metrology device on a top surface, and a combination of ultraviolet with visible and/or infrared light may be used to focus the optical metrology device on an underlying surface, where the ultraviolet wavelengths are used to exclude the light reflected from the top surface. A means for selecting a portion of the reflected light based on a characteristic of the reflected light that identifies at least one of the first image and the second image to determine a focus position of the optical metrology device may be, for example, one or more polarizing elements, such as a polarization detector 400 shown in FIG. 4, or one or more wavelength filtering elements, such as filter 157 or 159, and a detector 158 capable of detecting wavelengths, such as ultraviolet wavelengths, visible wavelengths, infrared wavelengths, or a combination thereof.

At block 108, the focus position of the optical metrology device is determined using a location of the image on the focusing detector and the selected portion of the reflected light. The selected portion of the reflected light, for example, may be polarization state or wavelengths. In some implementations, a focal position of the optical metrology device may be altered based on the determined focus position. A means for determining the focus position of the optical metrology device using a location of the image on the focusing detector and the selected portion of the reflected light may include for example, one or more processors 162 and/or 172 with dedicated hardware or implementing executable code or software instructions in memory 174 and/or medium 182, shown in FIG. 1. A means for altering a focal position of the optical metrology device based on the determined focus position may be, for example, a stage servo controller 108cont and actuator 109 shown in FIG. 1.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A focusing system for determining a focus position of an optical metrology device, the focusing system comprising:
   a beam splitter positioned in an optical path of a reflected light, the beam splitter configured to direct a portion of the reflected light to a measurement detector and to direct a remaining portion of the reflected light to a focus detector; and
   the focus detector positioned to receive the remaining portion of the reflected light from the beam splitter, the focus detector receives an image of the reflected light on a detector array, wherein the image of the reflected light comprises at least one of a first image of light reflected from a top surface of the sample and a second image of light reflected from one or more layers underlying the top surface or a combination thereof, and generates signals based on a location of the image and a characteristic of the reflected light that identifies at least one of the first image and the second image;
   at least one processor coupled to receive the signals from the focus detector and to determine the focus position of the optical metrology device based on the signals.

2. The focusing system of claim 1, wherein the at least one processor is configured to find the location of the image of the reflected light on the detector array to determine the focus position of the optical metrology device.

3. The focusing system of claim 1, wherein the image of reflected light from the sample on the detector array comprises both the first image of light reflected from the top surface of the sample and the second image of light reflected from the one or more layers underlying the top surface, wherein the characteristic of the reflected light distinguishes the first image and the second image.

4. The focusing system of claim 1, wherein the characteristic of the reflected light is polarization.

5. The focusing system of claim 4, wherein the focus detector is a polarization detector comprising a plurality of macro pixels, each macro pixel comprising a micropolarizer array of micropolarizers aligned with corresponding pixels of the detector array, each micropolarizer in a macro pixel having discrete polarization orientations, wherein the at least one processor is configured to select the signals from the focus detector based on polarization states that are sensitive to light reflected from one or more of the top surface of the sample or layers underlying the top surface of the sample.

6. The focusing system of claim 5, further comprising:
   a rotating polarizer that polarizes the light that is obliquely incident on the sample; and
   wherein the at least one processor is configured to select the signals from the focus detector in response to changes in polarization of the light produced by the rotating polarizer.

7. The focusing system of claim 1, wherein the optical metrology device is an ellipsometer comprising a polarization state generator and a polarization state analyzer, and wherein the beam splitter is positioned in the optical path of the reflected light before the polarization state analyzer.

8. The focusing system of claim 1, wherein the characteristic of the reflected light is wavelength range.

9. The focusing system of claim 8, wherein the focus detector comprises the detector array that detects ultraviolet light that is reflected from the top surface of the sample.

10. The focusing system of claim 8, further comprising a filter positioned between the beam splitter and the detector array configured to permit the remaining portion of the reflected light having a first range of wavelengths to be incident on and form the image of the reflected light on a first set of pixels in the detector array, wherein light having the first range of wavelengths is sensitive to the top surface of the sample.

11. The focusing system of claim 10, wherein light having a second range of wavelengths is reflected from the one or more layers underlying the top surface of the sample, wherein the remaining portion of the reflected light having the second range of wavelengths is incident on a second set of pixels in the detector array, and the at least one processor is further configured to determine the focus position of the optical metrology device with respect to the one or more layers underlying the top surface of the sample based at least on the signals from the second set of pixels in the detector array that receive the reflected light having the second range of wavelengths.

12. The focusing system of claim 10, wherein the image of reflected light from the sample on the detector array comprises a first image of the light having the first range of wavelengths reflected from the top surface of the sample and a second image of light having a second range of wavelengths reflected from the one or more layers underlying the top surface, wherein the at least one processor is configured to find the location of at least one of the first image of light having the first range of wavelengths and the second image of light having the second range of wavelengths to determine the focus position of the optical metrology device.

13. The focusing system of claim 10, wherein the filter is on at least a portion of the detector array or is on a reflective element that directs the reflected light from the beam splitter to the focus detector.

14. The focusing system of claim 1, further comprising an actuator for altering a focal position of the optical metrology device, wherein the actuator alters the focal position of the optical metrology device based on the focus position determined by the at least one processor.

15. A method of determining a focus position of an optical metrology device, comprising:
    directing a first portion of reflected light from a sample towards a measurement detector and a second portion of the reflected light towards a focus detector;
    detecting an image of the reflected light with the focus detector, wherein the image of the reflected light comprises at least one of a first image of light reflected from a top surface of the sample and a second image of light reflected from one or more layers underlying the top surface or a combination thereof;
    selecting a portion of the second portion of the reflected light based on a characteristic of the reflected light that identifies at least one of the first image and the second image to determine the focus position of the optical metrology device; and
    determining the focus position of the optical metrology device using a location of the image on the focus detector and the selected portion of the second portion of the reflected light.

16. The method of claim 15, further comprising:
    polarizing the light that is obliquely incident on the sample;
    wherein selecting the portion of the reflected light comprises selecting polarization states that are sensitive to light reflected from one or more of the top surface of the sample or the one or more layers underlying the top surface of the sample.

17. The method of claim 15, wherein selecting the portion of the reflected light comprises selecting wavelengths of light that are sensitive to light reflected from one or more of the top surface of the sample or the one or more layers underlying the top surface of the sample.

18. The method of claim 15, further comprising altering a focal position of the optical metrology device based on the determined focus position.

19. A focusing system for determining a focus position of an optical metrology device, the focusing system comprising:
    a beam splitter positioned in an optical path of a reflected light, the beam splitter configured to direct a portion of the reflected light to a measurement detector and to direct a remaining portion of the reflected light to a focus detector;
    the focus detector positioned to receive the remaining portion of the reflected light, wherein the focus detector receives an image of reflected light on a detector array, wherein the image of the reflected light comprises at least one of a first image of light reflected from a top surface of the sample and a second image of light reflected from one or more layers underlying the top surface or a combination thereof;
    a means for selecting a portion of the remaining portion of the reflected light based on a characteristic of the reflected light that identifies at least one of the first image and the second image to determine the focus position of the optical metrology device; and
    a means for determining the focus position of the optical metrology device based on the image of the reflected light and the selected of the remaining portion of the reflected light.

20. The focusing system of claim 19, wherein the means for selecting the portion of the reflected light selects characteristics of the reflected light that are sensitive to light reflected from one or more of the top surface of the sample or the one or more layers underlying the top surface of the sample.

* * * * *